(12) United States Patent
Bergmeier

(10) Patent No.: US 11,161,635 B2
(45) Date of Patent: Nov. 2, 2021

(54) EGG-ORIENTING STATION FOR ORIENTING EGGS, AND APPARATUS FOR TRANSPORTING AND PACKAGING EGGS

(71) Applicant: Gerd Bergmeier, Hiddenhausen (DE)

(72) Inventor: Gerd Bergmeier, Hiddenhausen (DE)

( * ) Notice: Subject to any disclaimer, the term of this patent is extended or adjusted under 35 U.S.C. 154(b) by 104 days.

(21) Appl. No.: 16/623,941

(22) PCT Filed: Jun. 13, 2018

(86) PCT No.: PCT/EP2018/065605
§ 371 (c)(1),
(2) Date: Dec. 18, 2019

(87) PCT Pub. No.: WO2018/234111
PCT Pub. Date: Dec. 27, 2018

(65) Prior Publication Data
US 2020/0172276 A1    Jun. 4, 2020

(30) Foreign Application Priority Data

Jun. 19, 2017 (DE) ................. 10 2017 113 418.2

(51) Int. Cl.
*B65B 35/58* (2006.01)
*B65B 35/24* (2006.01)
(Continued)

(52) U.S. Cl.
CPC ............. *B65B 35/58* (2013.01); *B65B 35/24* (2013.01); *B65G 47/244* (2013.01);
(Continued)

(58) Field of Classification Search
CPC .......... B65B 35/58; B65B 5/08; B65B 23/08; B65B 35/24; B65B 43/145; B65B 21/20;
(Continued)

(56) References Cited

U.S. PATENT DOCUMENTS

| 1,945,888 A | * | 2/1934 | Fields | B65G 47/252 |
| | | | | 198/399 |
| 2,004,233 A | * | 6/1935 | Balcom | A43D 71/00 |
| | | | | 198/399 |

(Continued)

FOREIGN PATENT DOCUMENTS

| EP | 2842877 A1 | 3/2015 |
| GB | 966330 A | 8/1964 |

(Continued)

OTHER PUBLICATIONS

International Search Report dated Sep. 4, 2018 in related/corresponding International Application No. PCT/EP2018/065605.

(Continued)

*Primary Examiner* — Gregory W Adams
(74) *Attorney, Agent, or Firm* — Patent Portfolio Builders PLLC

(57) ABSTRACT

An egg-orienting station for an apparatus for transporting eggs and packaging them in egg packs has a plurality of tracks, which are arranged parallel to one another in the conveying direction, and a transfer region for transferring the eggs to a conveyor belt. An adjustment device is arranged upstream of the transfer region, the adjustment device being used to insert the eggs, optionally by way of the bottom or of the top of said eggs, in egg holders of the first conveyor belt.

13 Claims, 7 Drawing Sheets

Figure 1:
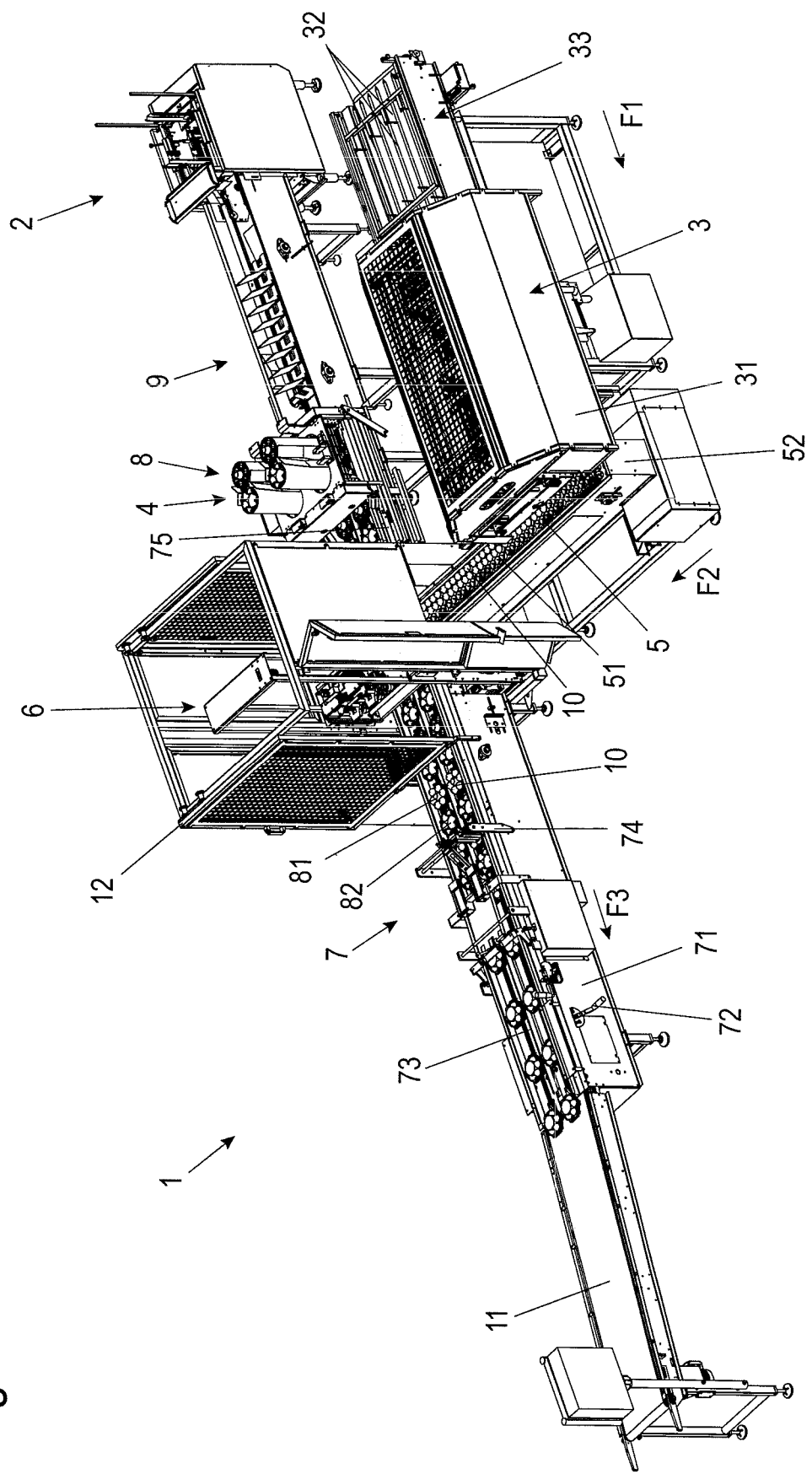

(51) Int. Cl.
  *B65G 47/244* (2006.01)
  *B25J 15/06* (2006.01)
  *B65B 5/08* (2006.01)
  *B65B 23/08* (2006.01)
  *B65B 43/14* (2006.01)
  *B65G 47/91* (2006.01)

(52) U.S. Cl.
  CPC .............. *B25J 15/0616* (2013.01); *B65B 5/08* (2013.01); *B65B 23/08* (2013.01); *B65B 43/145* (2013.01); *B65G 47/918* (2013.01); *B65G 2201/0208* (2013.01)

(58) Field of Classification Search
  CPC .............. B25J 15/0616; B25J 15/0061; B65G 47/244; B65G 47/918; B65G 2201/0208; B65G 47/907; B65G 2201/0238; B25B 11/007; H01L 21/68707
  See application file for complete search history.

(56) References Cited

U.S. PATENT DOCUMENTS

| | | | | |
|---|---|---|---|---|
| 3,148,761 A | * | 9/1964 | Niederer | A01K 43/00 198/384 |
| 3,162,293 A | * | 12/1964 | Loveland | A23N 4/14 198/383 |
| 3,369,644 A | * | 2/1968 | Niederer | B65B 23/06 198/389 |
| 3,478,862 A | * | 11/1969 | Niederer | A01K 43/00 198/389 |
| 3,497,052 A | | 2/1970 | Willsey | |
| 3,592,327 A | * | 7/1971 | Koch | B65B 23/06 198/400 |
| 4,335,811 A | * | 6/1982 | Niederer | B65G 43/08 198/446 |
| 4,603,772 A | | 8/1986 | Tomosue | |
| 4,645,058 A | * | 2/1987 | Meyn | B65B 23/06 198/400 |
| 4,907,687 A | * | 3/1990 | Meissner | A23N 4/14 198/394 |
| 7,743,906 B2 | * | 6/2010 | Accettura | B65G 43/08 198/446 |
| 8,607,960 B1 | | 12/2013 | Bliss et al. | |

FOREIGN PATENT DOCUMENTS

| | | | | |
|---|---|---|---|---|
| JP | 2003-206016 | * | 7/2003 | ............ B65G 43/08 |
| WO | 2016129992 A1 | | 8/2016 | |

OTHER PUBLICATIONS

Written Opinion dated Sep. 4, 2018 in related/corresponding International Application No. PCT/EP2018/065605.

* cited by examiner

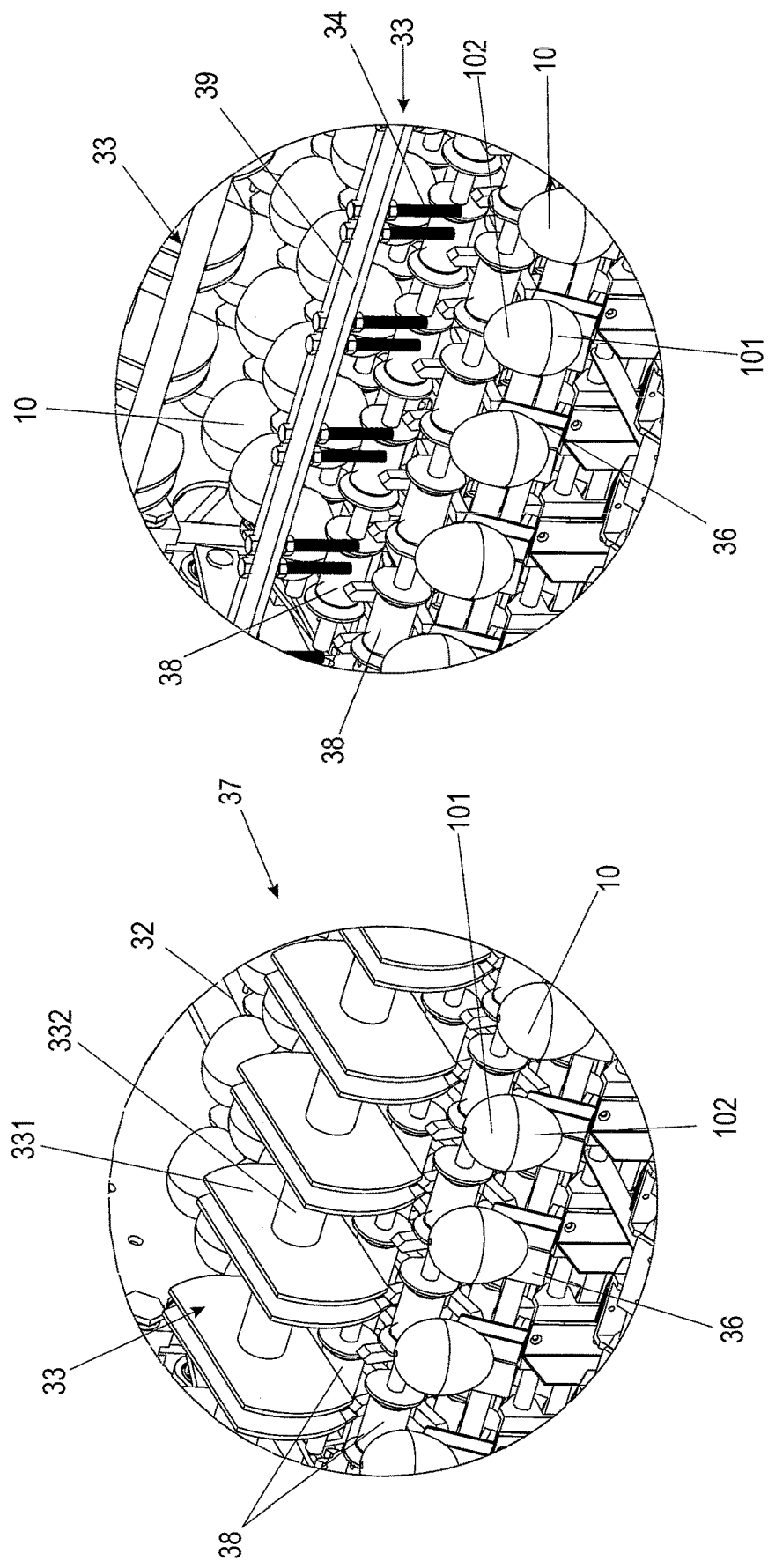

EGG-ORIENTING STATION FOR ORIENTING EGGS, AND APPARATUS FOR TRANSPORTING AND PACKAGING EGGS

BACKGROUND AND SUMMARY OF THE INVENTION

Exemplary embodiments of the present invention relate to an egg-orienting station for orienting eggs and to an apparatus for transporting eggs and packaging them.

Egg-orienting stations of this kind are needed such that eggs can be placed in a predetermined orientation, i.e., with the egg bottom facing downward or with the egg top facing downward, into an egg holder of a conveyor belt. Depending on the desired orientation, it is known to convey the eggs through separate orienting stations which are provided for the purpose and in which the eggs are oriented in a predetermined orientation and are then delivered to a conveyor belt for further processing.

A problem with the known egg-orienting stations used in apparatuses for transporting and packaging eggs is that different egg-orienting stations have to be employed for different egg packs.

Exemplary embodiments of the present invention are directed to an improved egg-orienting station and an apparatus for transporting eggs and packaging them, with which a large number of egg packs can be filled without the need to provide a plurality of egg-orienting stations.

The egg-orienting station according to the invention has a plurality of tracks, which are arranged parallel to one another in the conveying direction, and a transfer region for transferring the eggs to a conveyor belt. An adjustment device is arranged upstream from the transfer region, with which adjustment device the eggs can be placed either with the egg bottom or the egg top into egg holders of the first conveyor belt.

According to an advantageous embodiment variant, the adjustment device has a rod extending transversely with respect to the tracks and which is secured pivotably on a housing of the egg-orienting station, and indexing plates oriented in the conveying direction are arranged on the rod. Such a transverse rod can be mounted easily and cost-effectively on a housing of the egg-orienting station.

According to a further embodiment variant, the indexing plates are oriented in such a way that the eggs abutting the end edges of the indexing plates rotate during the onward movement in the conveying direction, such that the egg tops face forward in the conveying direction. The indexing plates can be designed here as easy-to-produce plate-shaped bodies.

The adjustment device preferably has a rail extending transversely with respect to the tracks and which is secured pivotably on a housing of the egg-orienting station and has spring elements secured thereon, which rail is pivotable into the conveying path of the eggs, wherein the rail in its functional position is held above the tracks in such a way that the spring elements come into engagement with the eggs. Thus, an exchange of the rod or rail required for the desired egg orientation is easily permitted by inward or outward pivoting.

According to a further preferred embodiment variant, the spring elements are designed as helical springs, which are resiliently movable transversely with respect to their longitudinal axis. Such helical springs are durable and can be produced cost-effectively.

The spring elements, in the functional position of the rail, are preferably positioned in a direction transverse to the tracks in such a way that the eggs are abutted so that they orient themselves with the egg bottom toward the front in conveying direction.

According to a further embodiment variant, conveying rollers for conveying the eggs onward are arranged in the transfer region, wherein a chute is arranged downstream from each of the conveying rollers in the conveying direction, on which chutes the respective egg can be conveyed farther down into an egg holder of a first conveyor belt arranged underneath the transfer region.

The adjustment device is preferably activatable via an actuation lever.

The apparatus for transporting eggs and packaging them in egg packs has at least one unstacking station for empty egg packs, an egg-orienting station, a relocation station for relocating the eggs from a conveyor belt, with a plurality of adjacent egg holders, into an egg pack, a pack-closing station, and an output station. The relocation station is configured in accordance with the relocation apparatus described above.

BRIEF DESCRIPTION OF THE DRAWING FIGURES

Figure 2:
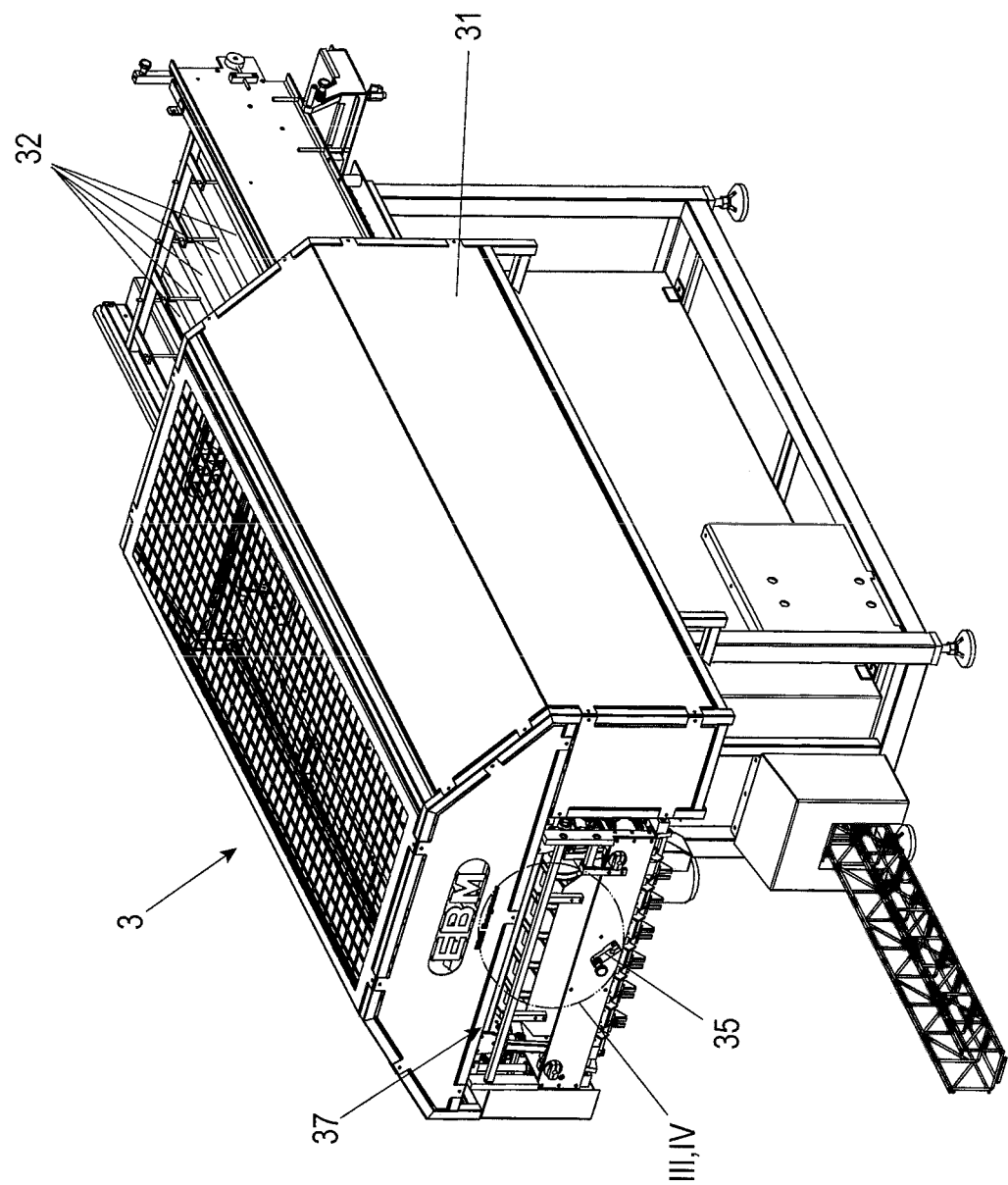
Figure 5:
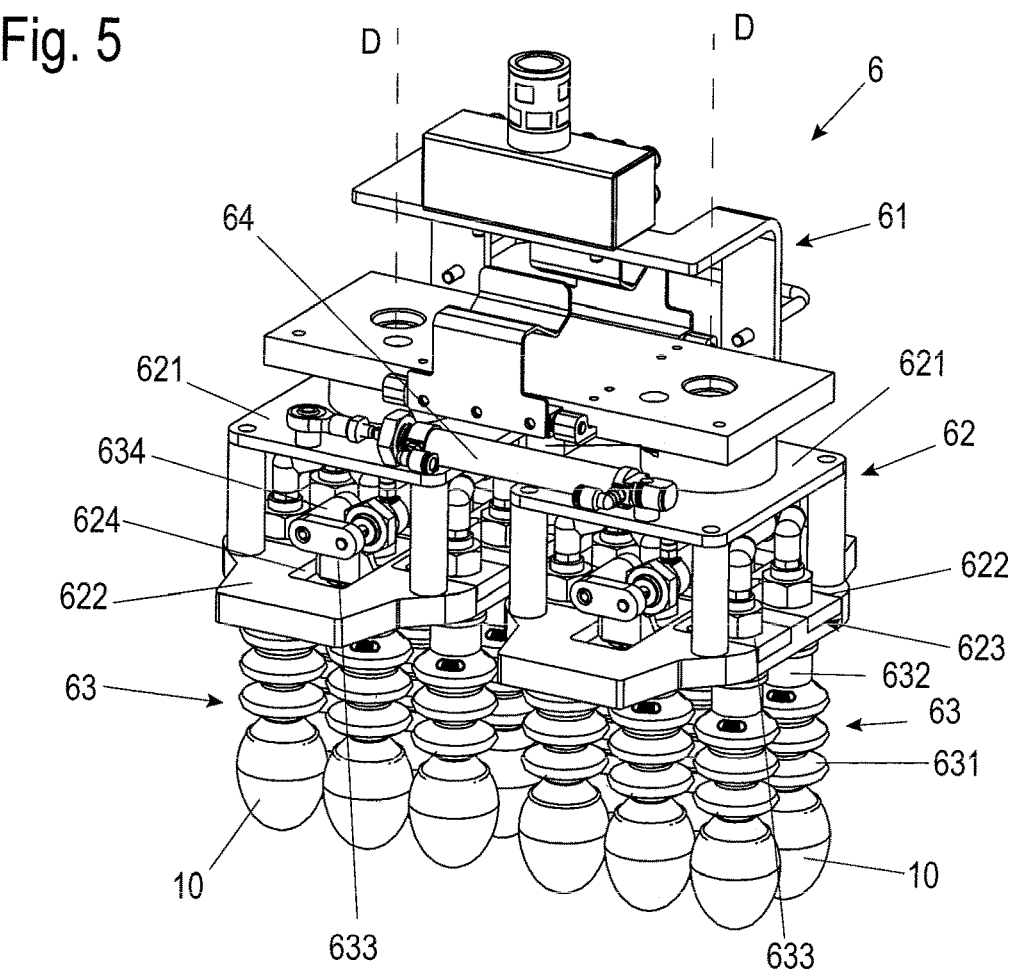
Figure 6:
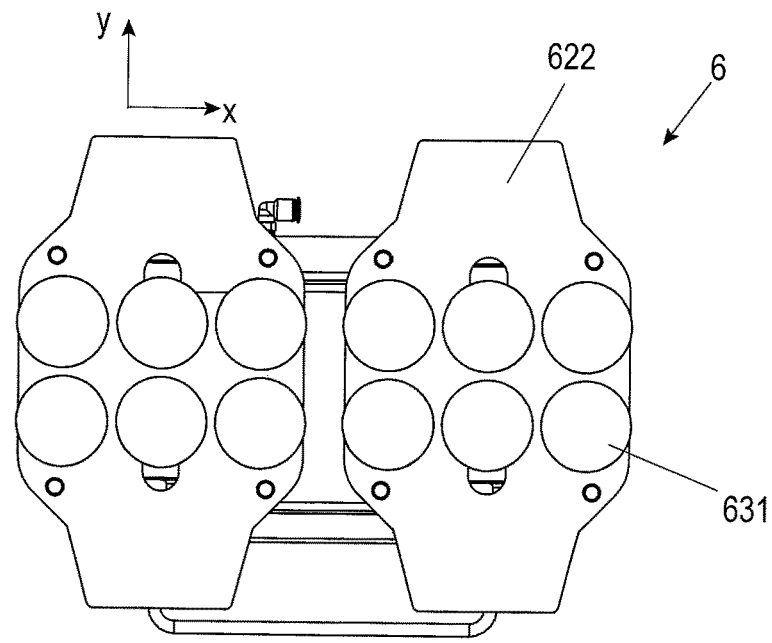
Figure 7:
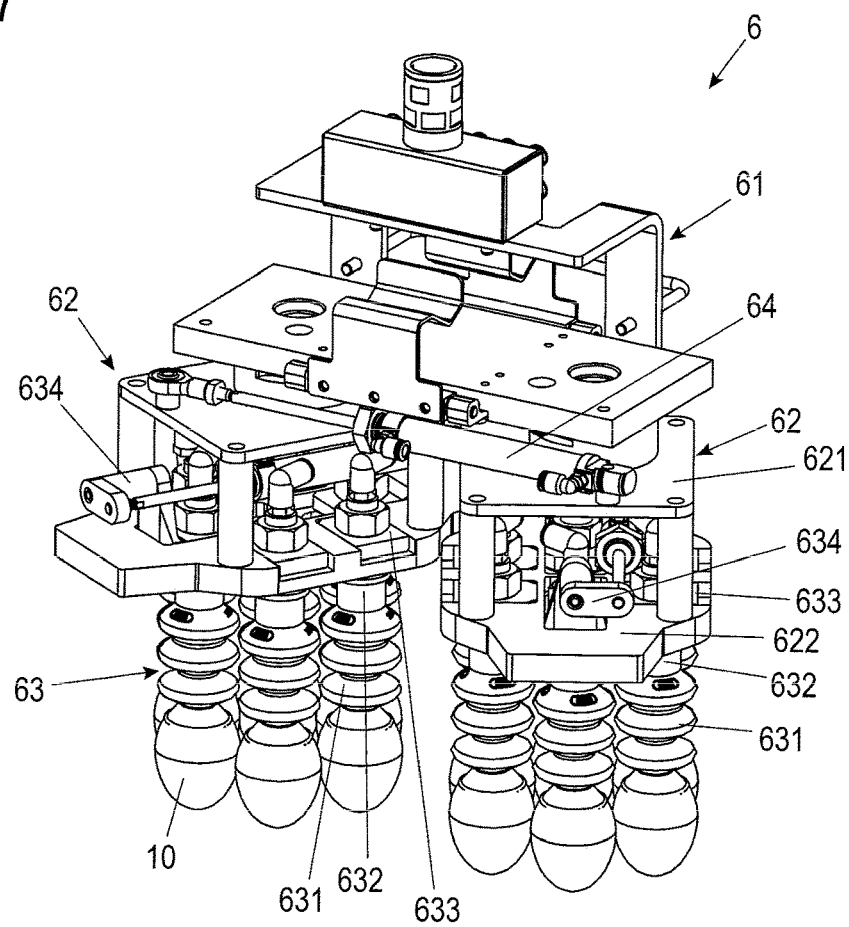
Figure 8:
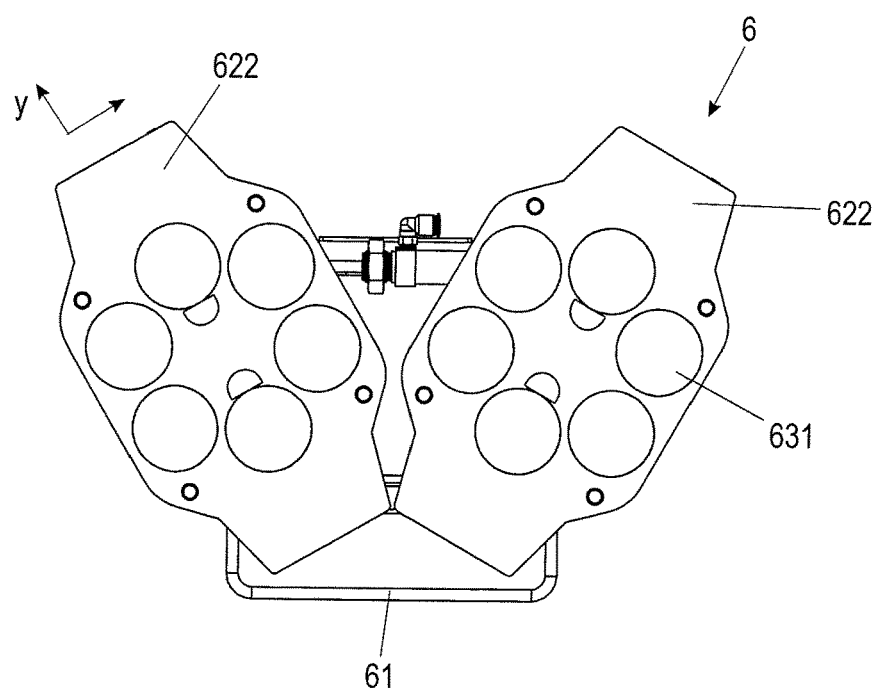
Figure 10:
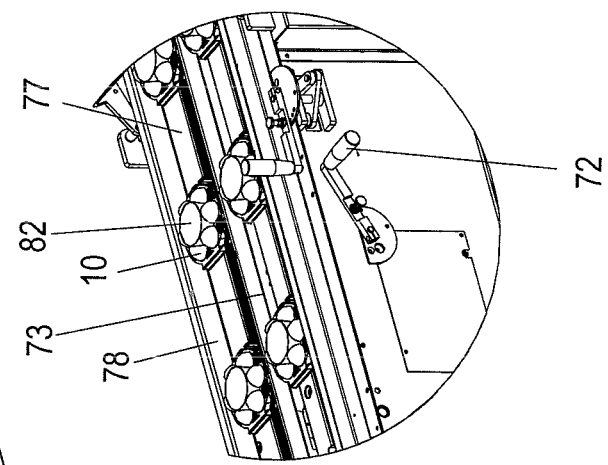
Figure 9:
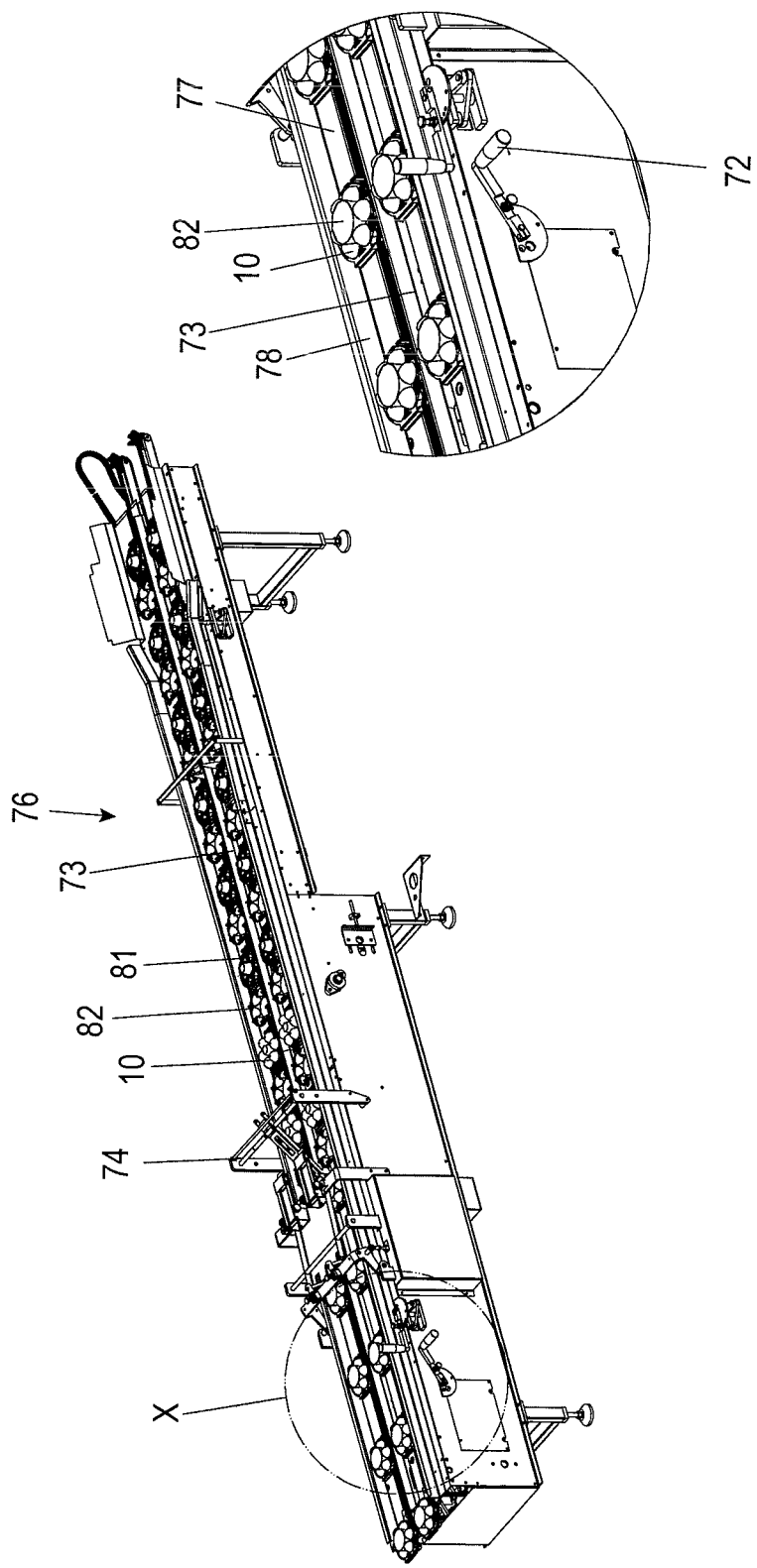
Figure 11:
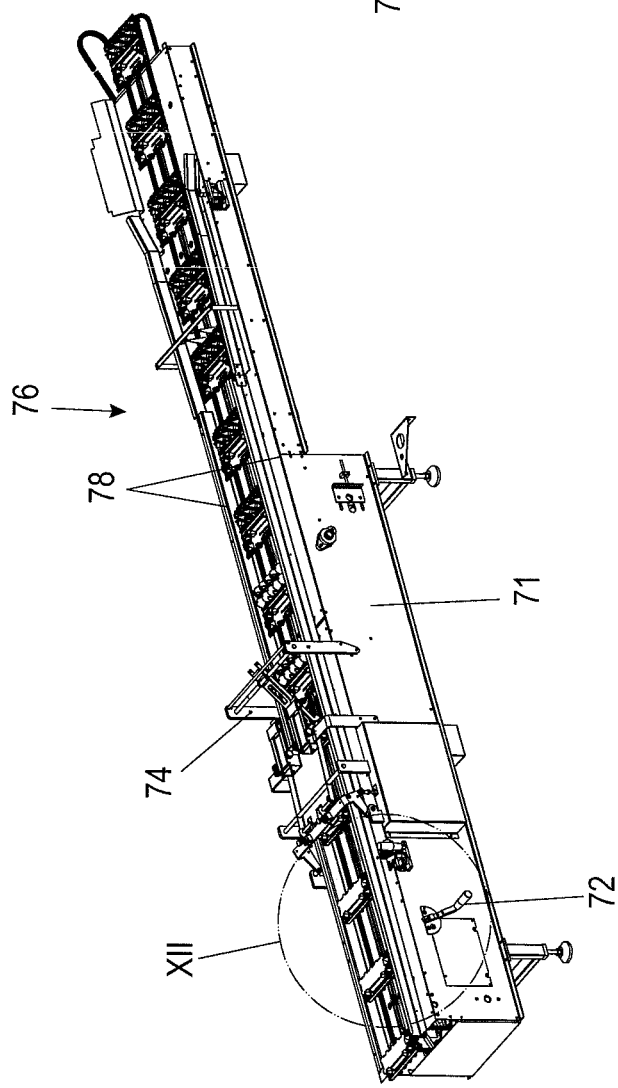
Figure 12:
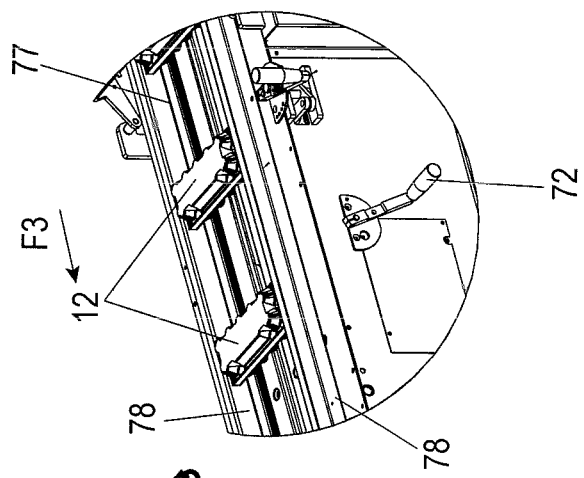

A preferred embodiment variant of the invention is explained in more detail below with reference to the accompanying drawings, in which:

FIG. 1 shows a perspective view of an embodiment variant of an apparatus according to the invention for transporting eggs and packaging them, FIG. 2 shows a detailed view of an egg-orienting station, FIGS. 3 and 4 show the detail, indicated by III and IV in FIG. 2, of the egg-orienting station in different orientation positions, FIG. 5 shows a perspective detailed view of an embodiment variant of a relocation apparatus, FIG. 6 shows a bottom view of the relocation apparatus according to FIG. 5, FIG. 7 shows a perspective detailed view of the relocation apparatus from FIG. 5 in a star arrangement of the suction lift elements, FIG. 8 shows a bottom view of the relocation apparatus according to FIG. 7, FIG. 9 shows a perspective detailed view of a pack-closing station, FIG. 10 shows a detail, designated by X in FIG. 9, of the pack-closing station with raised guide rail, and FIGS. 11 and 12 show views of the package-closing station, corresponding to FIGS. 9 and 10, with the guide rail lowered.

DETAILED DESCRIPTION

In the following description of the figures, terms such as upward, downward, left, right, front, rear, etc., relate exclusively to the position of the relocation apparatus, the conveyor belt, the egg pack, the egg-orienting station, the unstacking station, the pack-closing station, the suction lift elements and the like as chosen by way of example in the respective figures.

In FIG. 1, the reference sign 1 designates overall an embodiment variant of an apparatus according to the invention for transporting eggs 10 and packaging them in egg packs 8.

The apparatus 1 has a delivery station for egg packs 8, which is here in the form of two unstacking stations 2, 4 that can be filled with egg packs that are different from one another.

Thus, the unstacking station 2 serves for the unstacking of vertically stacked egg packs comprising two rows, in particular for 6, 10 or 12 eggs.

The two-row egg packs are guided via a compartmentalized belt 9 onto a conveyor belt 75 that leads to a pack-closing station 7. In the embodiment variant shown here, the unpacking station 4 is positioned such that the egg packs 8 are deposited directly onto the conveyor belt 75.

The second unstacking device 4 serves for the unstacking of vertically stacked star-shaped packs for eggs, wherein each of these packs 8 is preferably configured to receive six eggs 10.

A delivery station for the eggs 10 that are to be packaged is arranged parallel to the lane of the egg pack delivery. The eggs 10 are for this purpose guided in a conveying direction $F_1$ onto a conveying path 33 having a plurality of mutually parallel tracks 32 of an egg-orienting station 3.

From this egg-orienting station 3, the eggs 10 are placed either with the egg bottom 101 or the egg top 102 into egg holders 51 of a first conveyor belt 5.

This first conveyor belt 5 serves to convey the eggs from the egg-orienting station 3 in a conveying direction $F_2$ to a relocation apparatus 6, which serves to relocate the eggs 10 from the conveyor belt 5 into the egg packs 8.

The egg packs 8 filled with eggs 10 are then conveyed onward through a pack-closing station 7 in which the egg packs 8, from an opened loading position in which a pack lid 82 folded open in the conveying direction $F_3$ before a pack base 81 of the egg packs 8 is positioned on the transport belt 75, is closed by folding the pack lid 82 over onto the respective pack base 81.

Thereafter, the egg pack 8 thus filled with eggs 10 is conveyed onward to an output station 11.

Details of the egg-orienting station 3 are shown in FIGS. 2 to 4. Such an egg-orienting station 3 is also designated as a lifting case packer.

As is shown in FIGS. 2 to 4, the eggs 10, having been placed onto the track 32 lying on their side, are guided in a rolling movement in the direction of a transfer region 37.

Arranged in this transfer region 37 is an adjustment device 33 with which the eggs 10 can be placed either with the egg bottom 101 or the egg top 102 into respective egg holders 51 of the first conveyor belt 5.

The adjustment device 33 has a rod 332 extending transversely with respect to the tracks 32 and which is secured pivotably on a housing 31 of the egg-orienting station 3, and indexing plates 331 oriented in the conveying direction F are arranged on the rod 332.

The indexing plates 331 are oriented in such a way that the eggs 10 abutting the end edges of these indexing plates 331 rotate during the onward movement in the conveying direction F such that the egg top 102 faces forward in the conveying direction.

The mutual spacing of the indexing plates 331 assigned to one of the tracks 32 is dimensioned in such a way that, between two adjacent indexing plates 331, a channel is formed that is smaller than the longitudinal extent of the eggs 10 but greater than the thickness of the eggs 10.

The eggs 10 are conveyed onward on conveying rollers 38 in the conveying direction F until they drop down a chute 36 into the egg holders 51 of the first conveyor belt 5 arranged underneath the transfer region 37, in this case with the egg top 102 facing downward.

If the eggs 10 are to be inserted into the egg holders 51 of the conveyor belt 5 with their egg top 102 facing upward, the adjustment device 33 is switched over, specifically such that the indexing plates 331 are disengaged from the eggs 10 and instead a rail 39, with spring elements 34 extending in the direction of the eggs 10, is arranged in, in particular pivoted into, the conveying path of the eggs 10. These spring elements 34, preferably designed as helical springs extending from the rail 39 in the direction of the transport rollers 38, are positioned in a direction transverse to the tracks 32 of the egg-orienting station 3 in such a way that the eggs 10, during the onward transport via the rollers 38, are abutted so that they align themselves with the egg bottom 101 toward the front in the conveying direction and thus drop down the chute 36, with the egg bottom 101 facing downward, into the egg holders 51 of the conveyor belt 5.

The actuation of the adjustment device is preferably effected via an actuation lever 35. The actuation lever 35 is coupled to the rail 39 and to the rod 332 in such a way that by actuation, in particular pivoting, of the actuation lever 35 movable relative to the housing 31 of the egg-orienting station 3, the rod 332 with the indexing plates 331 is pivoted into the conveying region of the eggs 10 and the rail 39 is at the same time pivoted out from the conveying region of the eggs 10, and, upon actuation of the actuation lever 35 in the opposite direction, the rod 332 with the indexing plates 331 is pivoted out from the conveying region of the eggs 10 and the rail 39 is at the same time pivoted into the conveying region of the eggs 10.

It is also conceivable for the adjustment to be controlled by an electric motor.

As is shown in FIG. 1, the first conveyor belt 5 has several rows of egg holders 51 arranged in parallel. The conveying direction $F_2$ of the eggs 10 on the conveyor belt 5 is preferably perpendicular to the conveying direction $F_1$ of the eggs 10 along the egg-orienting station 3. The conveyor belt 5 conveys the eggs 10 to the relocation apparatus 6.

The conveyor belt 5 is preferably mounted in such a way that it is displaceable in the conveying direction $F_1$ underneath the transfer region 37 of the egg-orienting station 3 so as to be able to fill the parallel rows of egg holders 51.

The conveyor belt 5 is preferably composed of an endless belt on which the egg receptacles 51 are secured.

In the relocation apparatus 6, the eggs 10 are lifted by suction, with the aid of suction lift elements 63, from the egg holders 51 and are placed into the egg packs 8, which are transported in the direction of the output station on a conveyor device running underneath the relocation apparatus 6.

The relocation apparatus 6, which is preferably surrounded by slatted walls 12 for protection, has substantially a vertically movable and horizontally displaceable or pivotable frame 61, shown in FIGS. 5 to 8, with at least one mounting plate 622 of a mounting element 62, on which there are mounted several suction lift elements 63 that can be attached to a suction device, for example a vacuum pump.

These suction lift elements 63 are mounted on the mounting plate 622 so as to be displaceable, by motor or hydraulically, in the plane of the mounting plate 622 between a suction position and a set-down position.

As is shown in FIGS. 5 and 7 and by a comparison of FIGS. 5 to 8, six suction lift elements 63 are preferably mounted on the mounting plate 622.

Two of these suction lift elements 63 are movable linearly in a first displacement direction x, and the four other suction lift elements 63 are movable in a second displacement direction y, preferably perpendicular to the displacement direction x.

This makes it possible, by placing the suction lift elements 63 onto the eggs 10, to suck the eggs 10 arranged in parallel rows onto the egg holders 51 of the first conveyor belt 5, then to move the frame 61 to the output position and then, by switching off or interrupting the suction, to place them into the respective egg pack 8.

If the egg packs 8 are designed as egg packs with two rows, the suction lift elements 63 can remain in the suction position since, as is shown in FIG. 6 for example, the eggs 10 in this case are still held in a two-row arrangement by the suction lift elements 63.

If the eggs 10 are packed in a star arrangement in star-shaped packs for eggs 10, the suction lift elements 63 are moved accordingly to the positions shown in FIGS. 7 and 8 such that, before loading of the egg pack 8, the eggs 10 are arranged in a star arrangement corresponding to the star-shaped pack.

As is also shown in FIGS. 5 to 8, two such mounting elements 62 are preferably mounted alongside each other on the frame 61, as a result of which the capacity of this relocation apparatus 6 is increased.

Each of the suction elements 63 preferably has a suction cup 631, a tube or pipe section 632 that opens into an upper end of the suction cup 631 and is connected via a pipe or a tube to the suction device, and a guide part 633 connected to an adjustment mechanism 634. The guide parts 633 are guided displaceably in guide recesses 623, 624 of the mounting plate 622.

As is also shown in FIG. 7, the mounting elements 62 are pivotable about a rotation axis D oriented perpendicular to the mounting elements 62. It is also conceivable that only one of the mounting elements 62 is arranged on the frame 61 so as to be pivotable about such a rotation axis D.

After the eggs 10 have been placed in respective bases 81 of egg packs 8, the egg packs 8 filled with eggs 10 are conveyed onward to a pack-closing station 7 in which the pack lids 82, arranged upstream from the pack bases 81 in the conveying direction $F_3$, are closed by folding them onto the pack bases 81 and are conveyed onward to an output station 11.

For improved guiding of the egg packs 8, the pack-closing station 7 has a guide rail 76 extending in the conveying direction $F_3$, which guide rail 76 can be raised or lowered and which, as is shown in FIGS. 9 and 10, serves to guide star-shaped packs or also two-row packs with six eggs.

These star-shaped packs or two-row packs with six eggs are only about half as wide as two-row packs with twelve eggs, which can likewise be placed in the apparatus for transporting and packaging eggs 10.

The twelve-egg packs are preferably likewise conveyed on the conveyor belt 75 transversely with respect to the conveying direction $F_3$. The guide rail 76 is moved to the base 77 of the pack-closing station 7 such that these egg packs 12 are guided by edge-side rails 78.

In the embodiment variant shown here, the guide rail 76, which can be raised or lowered in the center of the base 77, is raised or lowered with the aid of a manual lever 72. It is also conceivable that this rail 76 is controlled by an electric motor.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 apparatus
2 unstacking station
3 egg-orienting station
31 housing
32 track
33 adjustment device
331 indexing plate
332 transverse rod
34 spring element
35 manual lever
36 chute
37 transfer region
38 roller
39 rail
4 unstacking station
5 conveyor belt
51 egg holder
52 belt housing
6 relocation device
61 frame
62 mounting element
621 cover plate
622 mounting plate
623 guide recess
624 guide recess
63 suction lift element
631 suction cup
632 tube or pipe section
633 guide part
634 adjustment mechanism
7 pack-closing station
71 belt housing
72 manual lever
73 guide rail
74 flip bar
75 conveyor belt
76 insertion region
77 base
78 guide rail
8 egg pack
81 base
82 lid
9 compartmentalized belt
10 egg
11 output station
12 egg pack
x direction of travel
y direction of travel
$F_1$ conveying direction
$F_2$ conveying direction
$F_3$ conveying direction

The invention claimed is:

1. An egg-orienting station for an apparatus for transporting eggs and packaging them in egg packs, the egg-orienting station comprising:

a plurality of tracks, which are arranged parallel to one another in a conveying direction;
a transfer region for transferring the eggs to a conveyor belt; and
an adjustment device arranged upstream from the transfer region, wherein the adjustment device is configured to place the eggs with either with an egg bottom or an egg top into egg holders of the conveyor belt, wherein the adjustment device includes a rod extending transversely with respect to the plurality of tracks, wherein the rod is pivotably secured on a housing of the egg-orienting station, and wherein indexing plates oriented in the conveying direction are arranged on the rod.

2. The egg-orienting station of claim 1, wherein the indexing plates are oriented in such a way that the eggs abutting the end edges of the indexing plates rotate during an onward movement in the conveying direction, such that the egg tops face forward in the conveying direction.

3. The egg-orienting station of claim 1, wherein mutual spacing of the indexing plates assigned to one of the plurality of tracks is dimensioned in such a way that, between two adjacent indexing plates, a channel is formed which is smaller than a longitudinal extent of the eggs but greater than a thickness of the eggs.

4. The egg-orienting station of claim 1, wherein the transfer region comprises:
conveying rollers for conveying the eggs onward,
wherein a chute is arranged downstream from each of the conveying rollers in the conveying direction, on which chutes the respective egg being conveyed farther down into an egg holder of the conveyor belt on the chutes, wherein the conveyor belt is arranged underneath the transfer region.

5. The egg-orienting station of claim 1, wherein the adjustment device is activatable via an actuation lever.

6. An egg-orienting station for an apparatus for transporting eggs and packaging them in egg packs, the egg-orienting station comprising:
a plurality of tracks, which are arranged parallel to one another in a conveying direction;
a transfer region for transferring the eggs to a conveyor belt; and
an adjustment device arranged upstream from the transfer region, wherein the adjustment device is configured to place the eggs with either with an egg bottom or an egg top into egg holders of the conveyor belt,
wherein the adjustment device has a rail extending transversely with respect to the plurality of tracks, wherein the rail is pivotably secured on a housing of the egg-orienting station, wherein spring elements are secured on the rail, wherein the rail is pivotable into a conveying path of the eggs, and wherein the rail in its functional position is held above the plurality of tracks in such a way that the spring elements come into engagement with the eggs.

7. The egg-orienting station of claim 6, wherein the spring elements are helical springs that are resiliently movable transversely with respect to a longitudinal axis of the helical springs.

8. The egg-orienting station of claim 6, wherein the spring elements, in the functional position of the rail, are positioned in a direction transverse to the plurality of tracks in such a way that the eggs are abutted so that the eggs orient themselves with the egg bottom toward a front in the conveying direction.

9. The egg-orienting station of claim 6, wherein the transfer region comprises:
conveying rollers for conveying the eggs onward,
wherein a chute is arranged downstream from each of the conveying rollers in the conveying direction, on which chutes the respective egg being conveyed farther down into an egg holder of the conveyor belt on the chutes, wherein the conveyor belt is arranged underneath the transfer region.

10. The egg-orienting station of claim 6, wherein the adjustment device is activatable via an actuation lever.

11. An apparatus for transporting eggs and packaging them in egg packs, the apparatus comprising:
at least one unstacking station for empty egg packs;
an egg-orienting station by which the eggs guided along a first conveying path are oriented and placed in egg holders of a first conveyor belt;
a relocation station for relocating the eggs from the first conveyor belt into an egg pack;
a pack-closing station; and
an output station,
wherein the egg-orienting station comprises
a plurality of tracks, which are arranged parallel to one another in a conveying direction;
a transfer region for transferring the eggs to the first conveyor belt; and
an adjustment device arranged upstream from the transfer region, wherein the adjustment device is configured to place the eggs with either with an egg bottom or an egg top into egg holders of the first conveyor belt.

12. The apparatus of claim 11, wherein the transfer region comprises:
conveying rollers for conveying the eggs onward,
wherein a chute is arranged downstream from each of the conveying rollers in the conveying direction, on which chutes the respective egg being conveyed farther down into an egg holder of the conveyor belt on the chutes, wherein the conveyor belt is arranged underneath the transfer region.

13. The apparatus of claim 11, wherein the adjustment device is activatable via an actuation lever.

* * * * *